(12) United States Patent
Min et al.

(10) Patent No.: US 7,612,962 B2
(45) Date of Patent: Nov. 3, 2009

(54) HOUSING OPENING AND CLOSING APPARATUS FOR DVD CAMCORDER

(75) Inventors: Sang-ki Min, Hwaseong-si (KR); Chang-hee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 396 days.

(21) Appl. No.: 11/481,827

(22) Filed: Jul. 7, 2006

(65) Prior Publication Data

US 2007/0139813 A1 Jun. 21, 2007

(30) Foreign Application Priority Data

Dec. 19, 2005 (KR) .................. 10-2005-0125580

(51) Int. Cl.
*G11B 17/022* (2006.01)
(52) U.S. Cl. ............... 360/99.06; 360/99.07; 720/610; 720/619; 720/640
(58) Field of Classification Search .......... 360/96.6, 360/99.06, 99.07; 720/610, 619, 640
See application file for complete search history.

(56) References Cited

U.S. PATENT DOCUMENTS

| | | | | | |
|---|---|---|---|---|---|
| 4,665,452 | A | * | 5/1987 | An .................. | 360/96.51 |
| 5,452,149 | A | * | 9/1995 | Kim ................. | 360/71 |
| 5,963,528 | A | * | 10/1999 | Fujimura et al. ...... | 720/655 |
| 6,215,753 | B1 | * | 4/2001 | Matsumoto .......... | 720/640 |
| 6,426,873 | B1 | * | 7/2002 | Minase et al. ........ | 361/686 |
| 6,826,764 | B2 | * | 11/2004 | Fujisawa ............ | 720/610 |
| 6,925,647 | B1 | * | 8/2005 | Kabasawa ........... | 720/601 |
| 6,930,727 | B2 | | 8/2005 | Uwagawa et al. | |
| 2005/0125814 | A1 | * | 6/2005 | Yokota .............. | 720/618 |

FOREIGN PATENT DOCUMENTS

| | | |
|---|---|---|
| EP | 0 179 169 | 4/1986 |
| JP | 11-134757 | 5/1999 |
| JP | 2000-137937 | 5/2000 |
| KR | 1984-7810 | 3/1988 |

* cited by examiner

*Primary Examiner*—Jefferson Evans
(74) *Attorney, Agent, or Firm*—Roylance, Abrams, Berdo & Goodman, L.L.P.

(57) ABSTRACT

A housing opening and closing apparatus of a DVD camcorder includes a main frame in which a DVD is accommodated, a housing which is opened and closed with respect to the main frame, and a housing ejecting unit operated by a solenoid unit to open and close the housing. The housing ejecting unit may include a pair of connection members disposed on the housing and an ejecting member formed between the pair of connection members on the housing. A link member is rotatable about a first hinge axis, and the link member is adapted to contact the ejecting member. A sliding member is engaged with the first hinge axis and one end of the link member. The sliding member has a first end and a second end, and the sliding member is adapted to slide. A pair of locking members are rotated by sliding of the sliding member, and a solenoid unit is engaged with the first end of the sliding member. A third elastic member is disposed at the second end of the sliding member to oppose the solenoid unit.

19 Claims, 8 Drawing Sheets

HOUSING OPENING AND CLOSING APPARATUS FOR DVD CAMCORDER

CROSS-REFERENCE TO RELATED APPLICATIONS

This application claims the benefit under 35 U.S.C. § 119(a) of Korean Patent Application No. 2005-125580, filed on Dec. 19, 2005, in the Korean Intellectual Property Office, the entire disclosure of which is hereby incorporated by reference.

BACKGROUND OF THE INVENTION

1. Field of the Invention

The present invention relates to a DVD camcorder which can directly record and reproduce an image on a DVD loaded in the camcorder. More particularly, the present invention relates to a housing opening and closing apparatus for a DVD camcorder that can open and close a housing by using a solenoid.

2. Description of the Related Art

A DVD camcorder has various advantages in comparison with a camcorder using a magnetic tape. For example, in comparison with magnetic tape, the storage lifespan of data is relatively long, the stability of data is superior, and data can be easily deleted and generated. Moreover, a DVD camcorder can delete and edit images in the camcorder and does not need to "fast forward" or "rewind" to reproduce images. Accordingly, research and development of DVD camcorders has increased recently.

FIG. 1 is a view of the conventional DVD camcorder. Referring to FIG. 1, a DVD camcorder 1 includes a camcorder body 4, a main frame 3 formed at a side of the camcorder body 4 to mount a DVD D, and a housing 2 openable and closable with respect to the main frame 3. The conventional DVD camcorder 1 has a housing ejecting unit (not shown) that uses a stepping motor as a driving source. The housing ejecting unit ejects the housing 2 from the main frame 3.

Typically, DVD camcorders are being reduced in size to make them more convenient. However, a conventional DVD camcorder using a housing ejection unit as that described above limits the ability to make the DVD camcorder smaller.

Accordingly, there is a need for a compact apparatus for opening and closing a housing of a DVD camcorder.

SUMMARY OF THE INVENTION

An aspect of the present invention is to address at least the above problems and/or disadvantages and to provide at least the advantages described below. Accordingly, an aspect of the present invention is to provide a compact housing opening and closing apparatus that uses a solenoid.

In accordance with an aspect of the present invention, a housing opening and closing apparatus for a DVD camcorder includes a main frame in which a DVD is loaded, a housing which is opened and closed with respect to the main frame, and a housing ejecting unit operated by a solenoid unit to open and close the housing.

The housing ejecting unit may comprise a pair of connection members disposed on the housing, an ejecting member disposed between the pair of connection members on the housing, a link member rotatable about a first hinge axis, the link member being adapted to contact the ejecting member, a sliding member engaged with the first hinge axis and one end of the link member, the sliding member comprising a first end and a second end, the sliding member being adapted to slide, a pair of locking members rotated by sliding of the sliding member, a solenoid unit engaged with the first end of the sliding member, and a third elastic member disposed at the second end of the sliding member to oppose the solenoid unit.

The pair of connection members may comprise a first connection member comprising a first locking protrusion, and a second connection member disposed opposite to the first connection member, the second connection member comprising a second locking protrusion.

The first and second connection members may be integrally formed.

The ejecting member may comprise a second hinge axis engaged with a sidewall of the housing, an ejector rotatable about the second hinge axis, the ejector comprising an inclined guide surface, and a fourth elastic member disposed on the ejector.

The first hinge axis may engage the main frame.

The link member may comprise a link body which is rotatably engaged with the first hinge axis, the link body comprising a first end and a second end, the first end of the link body contacting the ejecting member, and a link axis for movably engaging the second end of the link body with the sliding member.

The sliding member may comprise a bracket comprising a third guide slit for receiving the first hinge axis, and a first rotation guide portion and a second rotation guide portion extending from the bracket to contact the pair of locking members.

The bracket may further comprise a first guide slit and a second guide slit to receive a first supporting axis and a second supporting axis disposed on the main frame.

The pair of locking members may comprise a first rotation axis and a second rotation axis disposed at a certain interval on the main frame, a first locker rotatably engaged with the first rotation axis, a second locker rotatably engaged with the second rotation axis, a first elastic member disposed on the first rotation axis, a first end of the first elastic member engaging the first locker and a second end of the first elastic member engaging the main frame, and a second elastic member disposed on the first rotation axis, a first end of the second elastic member engaging the first locker and a second end of the second elastic member engaging the main frame.

The first and second lockers may be rotatable about the first and second rotation axes so that they are attached to and detached from the pair of connection members by sliding of the sliding member.

The solenoid unit may comprise a pair of coils wound on a pair of bobbins, a pair of plungers reciprocally moved in the pair of bobbins, ends of the pair of plungers being engaged with the sliding member, and a magnet disposed on the pair of coils.

The third elastic member may be a tension spring, a first end of the third elastic member engaging the sliding member and a second end of the third elastic member engaging the main frame.

BRIEF DESCRIPTION OF THE DRAWINGS

The above and other objects, features, and advantages of certain exemplary embodiments of the present invention will be more apparent from the following description taken in conjunction with the accompanying drawings, in which.

Throughout the drawings, the same reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
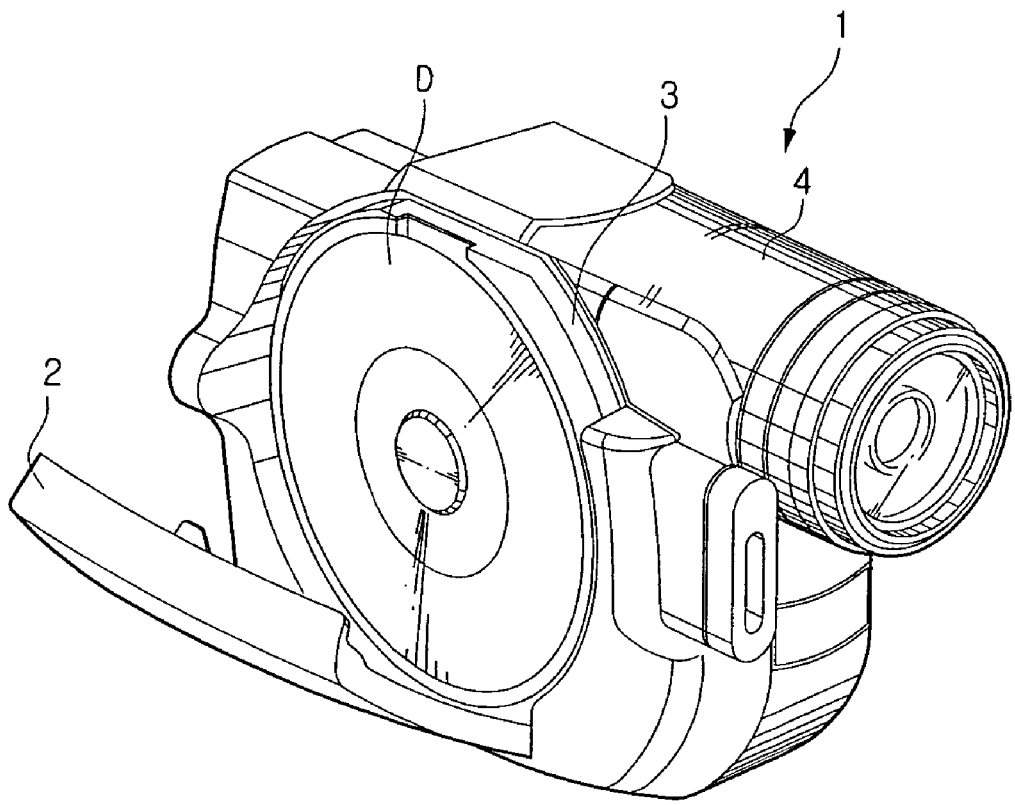
FIG. 1 is an external view of a conventional DVD camcorder.
Figure 2:
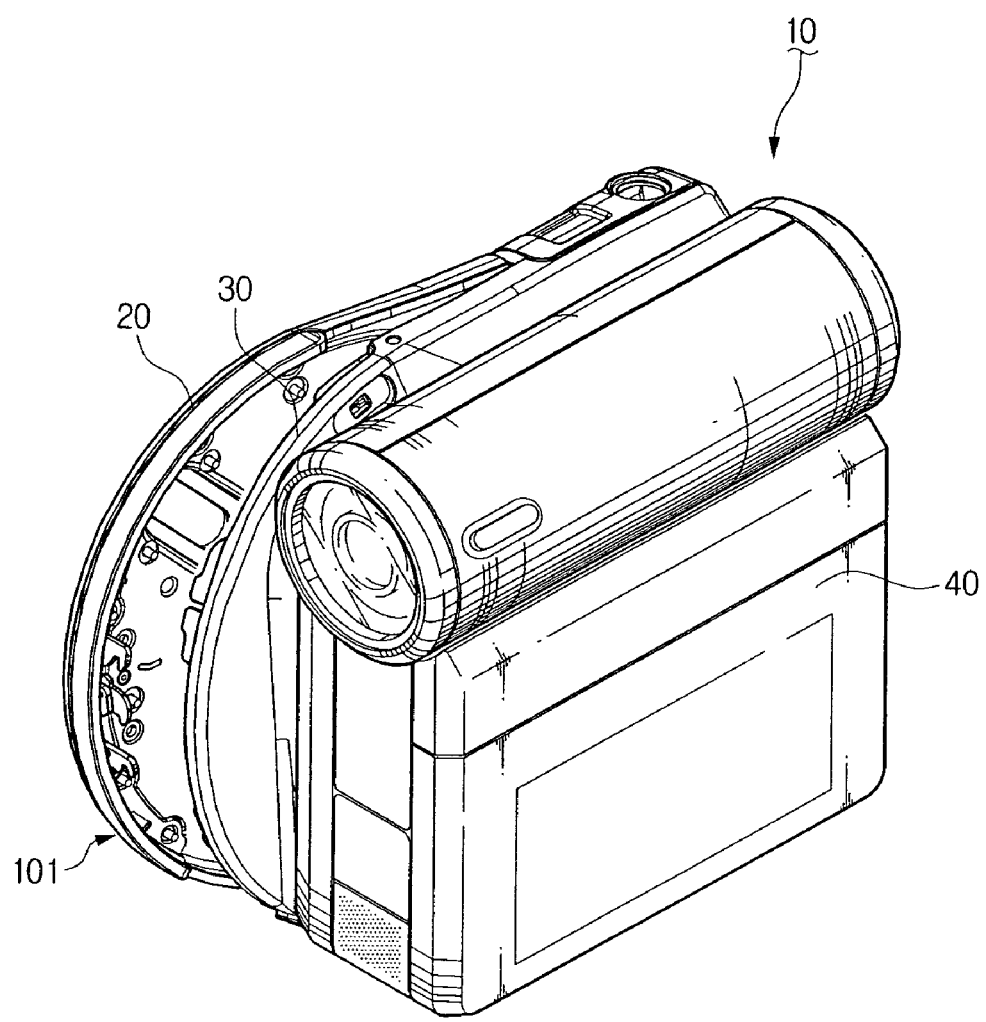
FIG. 2 is an external view of a DVD camcorder according to an exemplary embodiment of the present invention.
Figure 3:
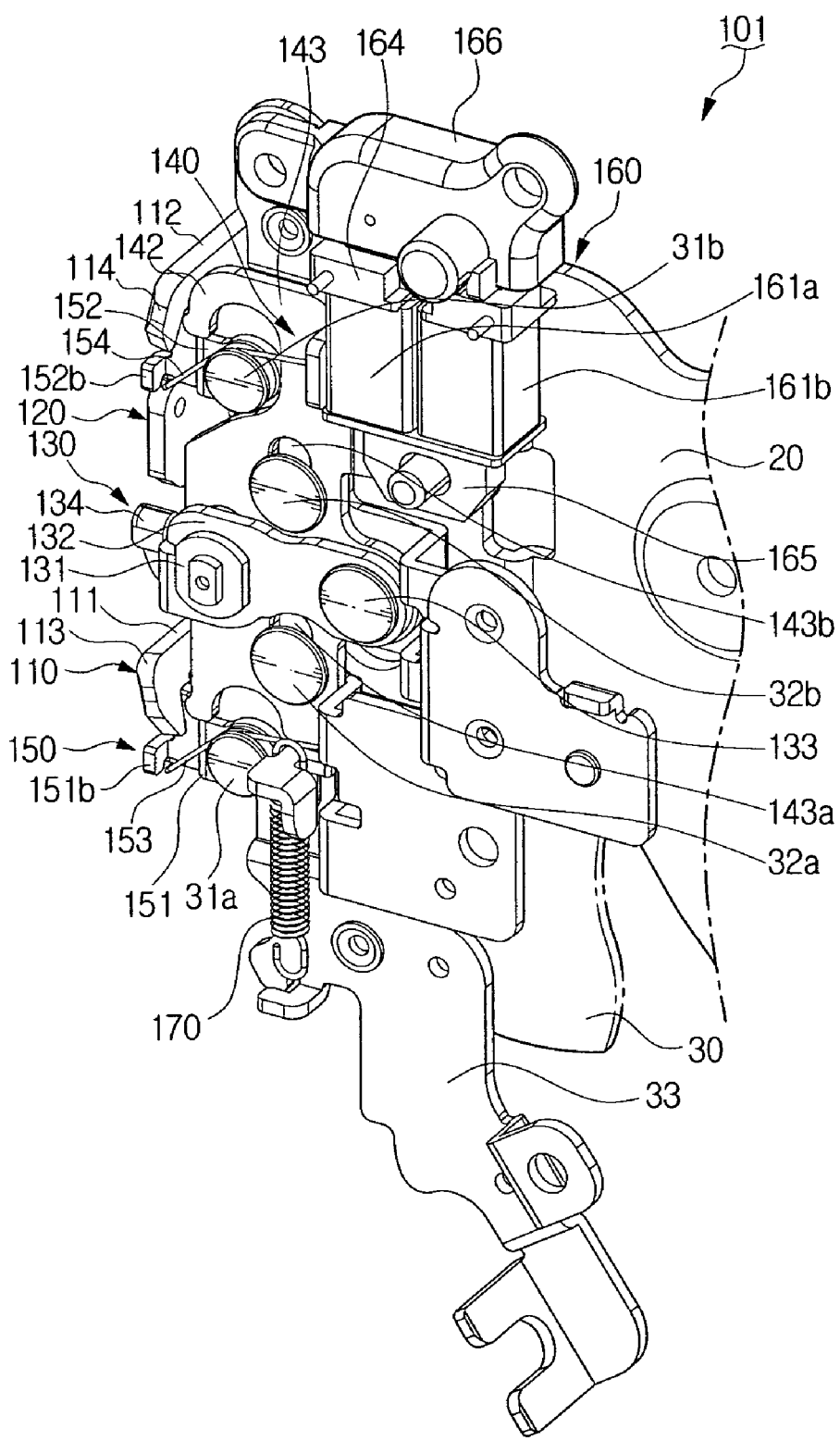
FIG. 3 is a detailed view of a housing opening and closing apparatus of FIG. 2.
Figure 4:
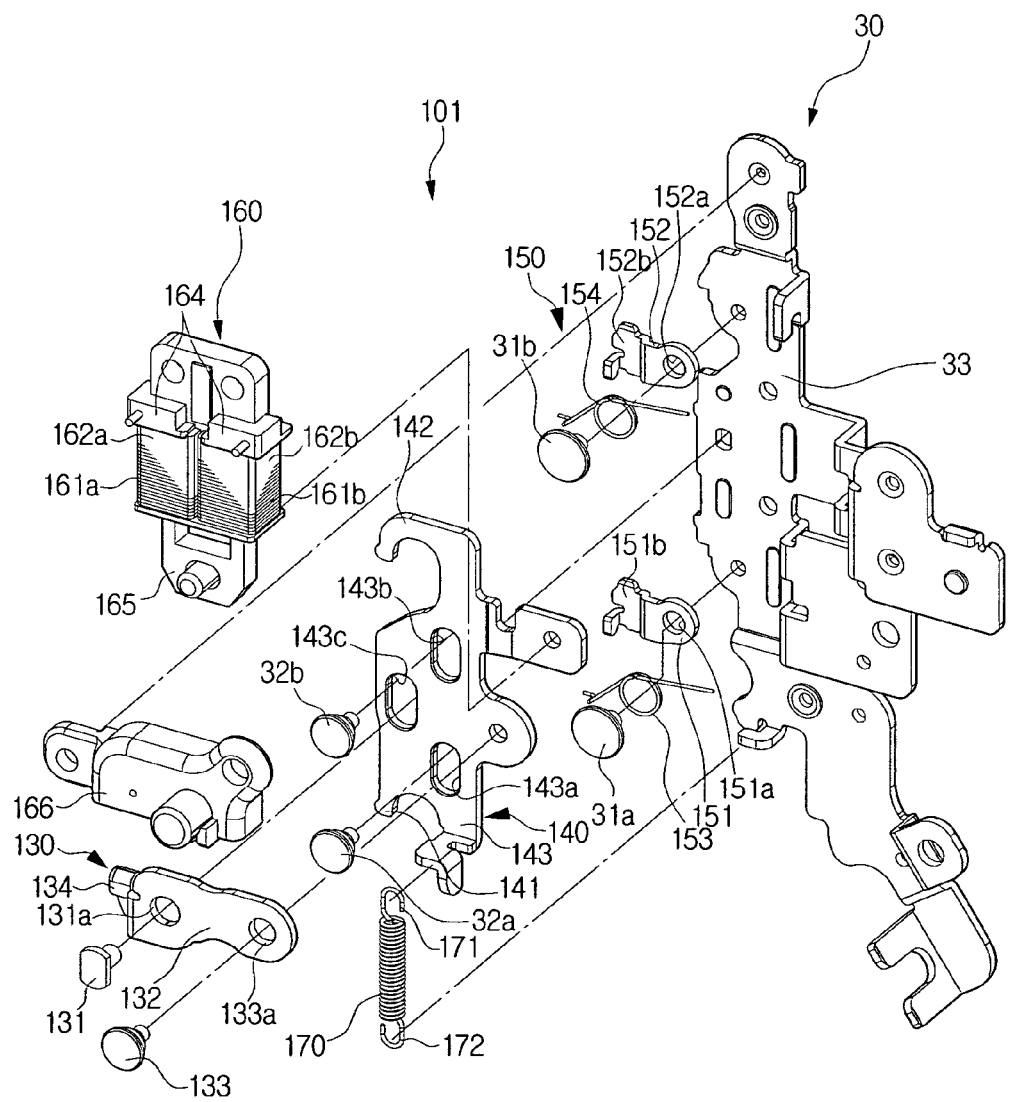
FIG. 4 is an exploded perspective view of a housing ejecting unit of FIG. 3.

FIG. 2 is an external view of a DVD camcorder according to an exemplary embodiment of the present invention, and FIG. 3 is a detailed view of a housing opening and closing apparatus mounted into the DVD camcorder. FIG. 4 is an exploded perspective view of a housing ejecting unit of the housing opening and closing apparatus, and FIG. 5 is an inner perspective view of a housing to which a housing connection member of the housing opening and closing apparatus is mounted.

Referring to FIGS. 2 and 3, a DVD camcorder 10 according to an exemplary embodiment of the present invention includes a main frame 30 to which a DVD is mounted, a housing 20 which is opened and closed with respect to the main frame 30, and a housing ejecting unit 101 which opens and closes the housing 20.

Figure 5:
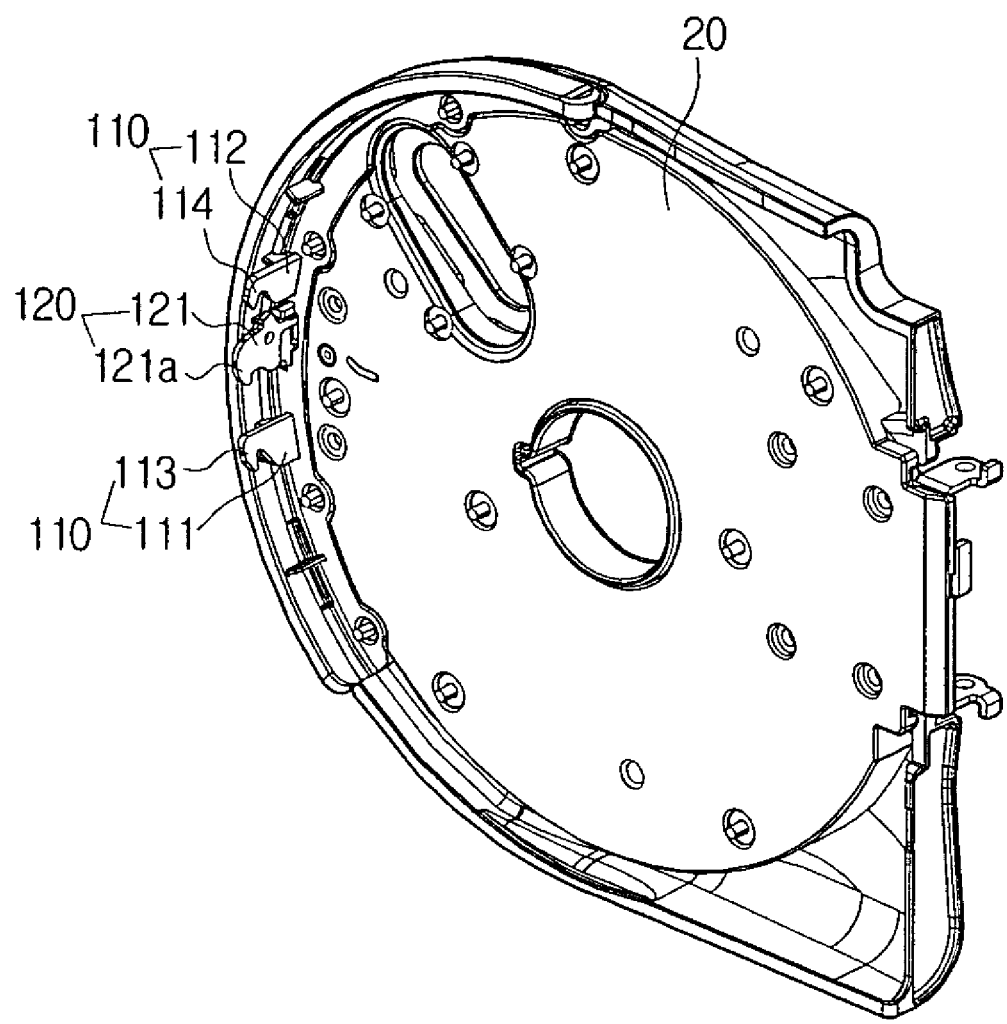
FIG. 5 is a perspective view of a housing to which a housing connection member of FIG. 3 is mounted.

As shown in FIGS. 3 through 5, the housing ejecting unit 101 of the DVD camcorder includes a pair of connection members 110, an ejecting member 120 formed between the pair of connection members 100 on the housing 20, a link member 130 formed at a position where it may contact the ejecting member 120, the link member rotating about a first hinge axis 131, a sliding member 140 connected to the first hinge axis 131 and the link member 130, a pair of locking members 150 that rotate according to the sliding of the sliding member 140, a solenoid unit 160 that is connected to an end of the sliding member 140, and a third elastic member 170 that is formed at the other end of the sliding member 140 opposite to the solenoid unit 160.

The pair of connection members 110 include a first connection member 111, and a second connection member 112 opposed to the first connection member 111. An ejecting member 120 may be formed between the first connection member 111 and the second connection member 112. A first locking protrusion 113 and a second locking protrusion 114 may be formed on upper portions of the first and second connection members 111 and 112. Due to the first and second locking protrusions 113 and 114, locking portions 151b and 152b of the pair of locking members 150 can be detached from and attached to the connection members 110. The locking portions 151b and 152b will be explained in detail later. The pair of connection members 110, that is, the first and second connection members 111 and 112, may be integrally formed into one part by, for example, injection molding. The ejecting member 120 may be attached directly to the housing 20, or between the pair of connection members 110. As shown in FIG. 5, the pair of connection members 110 are formed at one side of the inside of the housing 20.

In an exemplary embodiment, the ejecting member 120 may be formed between the connection members 110 as shown in FIG. 5. The ejecting member 120 includes an ejector 121, a second hinge axis 122 and a fourth elastic member 124 (refer to FIG. 6C). The second hinge axis 122 is formed at a sidewall 21 of the housing 20. The ejector 121 is rotated about the second hinge axis 122 and has an inclined guide surface 121a at an upper end portion and a fourth elastic portion 124 at a lower end portion. The inclined guide surface 121a of the ejector 121 guides a contact portion of the link member 130 when contacting the link member 130 so that the link member 130 can be rotated about the first hinge axis 131.

The connection members 110 and the ejecting member 120 of the housing ejecting unit 100 are attached to the housing 20; however, the other members except for the connection members 110 and the ejecting member 120 such as the link member 130 and the first hinge axis 131 are disposed at a rear side of the main frame 30.

The link member 130 is rotatably about the first hinge axis 131. The link member 130 includes a link body 132 and a link axis 133. The contact portion 134 may be formed at a first end of the link body 132 to push an upper portion of the ejector 121 of the ejecting member 120, and the second end of the link member 132 is engaged with the sliding member 140 by the link axis 133. Accordingly, the contact portion 134 and the link axis 133 of the link member 130 are rotated about the first hinge axis 131 in opposite directions to each other. Because the link axis 133 is separated from the main frame 30, a bracket 143 of the sliding member 140 can be slid in association with the rotation of the link body 132.

The sliding member 140 includes the bracket 143 disposed at the rear side of the main frame 30 and a first rotation guide portion 141 and a second rotation guide portion 142 formed at a front side of the bracket 143.

The bracket 143 is disposed at the rear side of the main frame 30, specifically, at a fixing frame 33 formed at the rear side of the main frame 30. A first guide slit 143a and a second guide slit 143b are formed on a central portion of the bracket 143 to receive a first supporting axis 32a and a second supporting axis 32b. The first and second supporting axes 32a and 32b are fixed on the main frame 30. Accordingly, the first and second guide slits 143a and 143b fit over the first and second supporting axes 32a and 32b, and the bracket 143 can be slid.

The bracket 143 additionally includes a third guide slit 143c at an upper portion of the central portion of the bracket 143. Because the link body 132 of the link member 130 is engaged with the first hinge axis 131, the link body 132 rotates about the first hinge axis 131; however, because the first hinge axis 131 is fit in the third guide slit 143c of the bracket 143, the bracket 143 is not rotated but slid based on the first hinge axis 131. The distance in which the bracket 143 can be slid can be adjusted according to the length of the first, second and third guide slits 143a, 143b and 143c.

The lower portion of the central portion of the bracket 143 is engaged with the link member 132 by the link axis 133. The bracket 143 is engaged with the solenoid unit 160 and one end of the third elastic member 170, respectively, based on the link member 130.

The first and second rotation guide portions 141 and 142 are formed at opposite ends of the front side of the bracket 143. The first and second rotation guide portions 141 and 142 come into contact with the pair of locking members 150, respectively, which will be explained in detail later. The first and second rotation guide portions 141 and 142 extend from the front side of the bracket 143 to the outside to come into contact with the pair of locking members 150. The first and second rotation guide portions 141 and 142 may enclose the locking members 150, that is, the first and second rotation axes 31*a* and 31*b*.

The pair of locking members 150 include the first and second rotation axes 31*a* and 31*b*, first and second lockers 151 and 152, and first and second elastic members 153 and 154.

The first and second rotation axes 31*a* and 31*b* are spaced apart at a certain interval on the main frame 30. Connection openings 151*a* and 152*a* of the first and second lockers 151 and 152 are rotatably engaged with the first and second rotation axes 31*a* and 31*b*. As the first and second lockers 151 and 152 pivoted about the first and second rotation axes 31*a* and 31*b*, the locking portions 151*b* and 152*b* of the first and second lockers 151 and 152 can be attached to and detached from the first and second locking protrusions 113 and 114 of the pair of connection members 111 and 112.

The first and second elastic members 153 and 154 are engaged with the first and second rotation axes 31*a* and 31*b*. The first ends of the first and second elastic members 153 and 154 are connected with the first and second lockers 151 and 152, and the second ends are connected with the main frame 30. In other words, the first and second elastic members 153 and 154 are formed to push the first and second lockers 151 and 152 toward the locking protrusions 113 and 114 of the pair of connection members 111 and 112. Because the first and second lockers 151 and 152 come into contact with the first and second rotation guide portions 141 and 142 of the bracket 143, the first and second rotation guide portions 141 and 142 can be slid together when the bracket 143 is slid. Accordingly, the first and second lockers 151 and 152 can be freely rotated about the first and second rotation axes 31*a* and 31*b* by the sliding of the first and second rotation guide portions 141 and 142 and the first and second elastic member 153 and 154.

The solenoid unit 160 converts electronic energy into a mechanical energy. The solenoid unit 160 includes a pair of coils 161*a* and 161*b* wound on bobbins 162*a* and 162*b*, a pair of plungers which move reciprocally in each of the bobbins 162*a* and 162*b*, and a magnet 164 formed on the pair of coils 161*a* and 161*b*. The first ends of the pair of plungers 163*a* and 163*b* are engaged with the bracket 143 through a body 166, and the second ends are inserted in each of bobbins 162*a* and 162*b*. The second ends of the plungers 163*a* and 163*b* are grounded and always adhered to the magnet 164 when power is cut-off. The solenoid unit 160 is attached to the fixing frame 33 or the main frame 30 by a fixing member 165.

In the solenoid unit 160, the plungers 163*a* and 163*b* are normally adhered to the magnet 164. However, if power is applied to the coils 161*a* and 161*b*, the power generates a magnetic flux in the bobbins 162*a* and 162*b* and the magnetic flux magnetically neutralizes the plungers 163*a* and 163*b* so that the plungers 163*a* and 163*b* can be separated from the magnet 164. Conversely, if power is cut-off to the coils 161*a* and 161*b*, the plungers 163*a* and 163*b* adhere to the magnet 164 again by a magnetic force.

The third elastic member 170 is disposed to oppose to the solenoid unit 160. A first end 171 of the third elastic member 170 is engaged with the bracket 143 of the sliding member 140 and the second end is engaged with the fixing frame 33 or the main frame 30. The third elastic member 170 may be a tension spring to pull the bracket 143 by an elastic tension force.

The operation of the housing opening and closing apparatus according to an exemplary embodiment of the present invention will now be described with reference to the accompanying drawings.

Figure 6A:
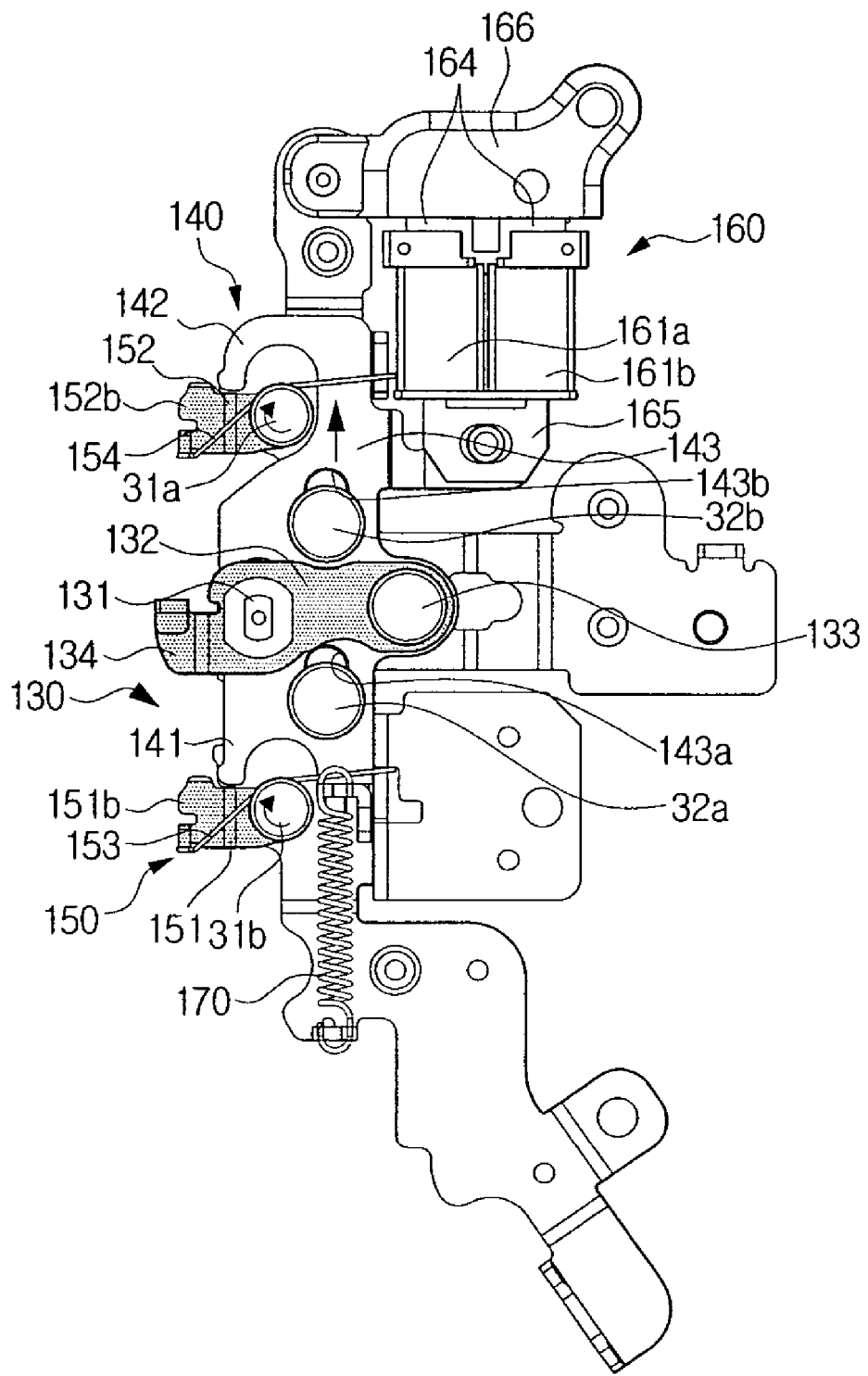
FIGS. 6A through 6C are views illustrating the operation of a housing ejecting unit according to an exemplary embodiment of the present invention.
Figure 6B:
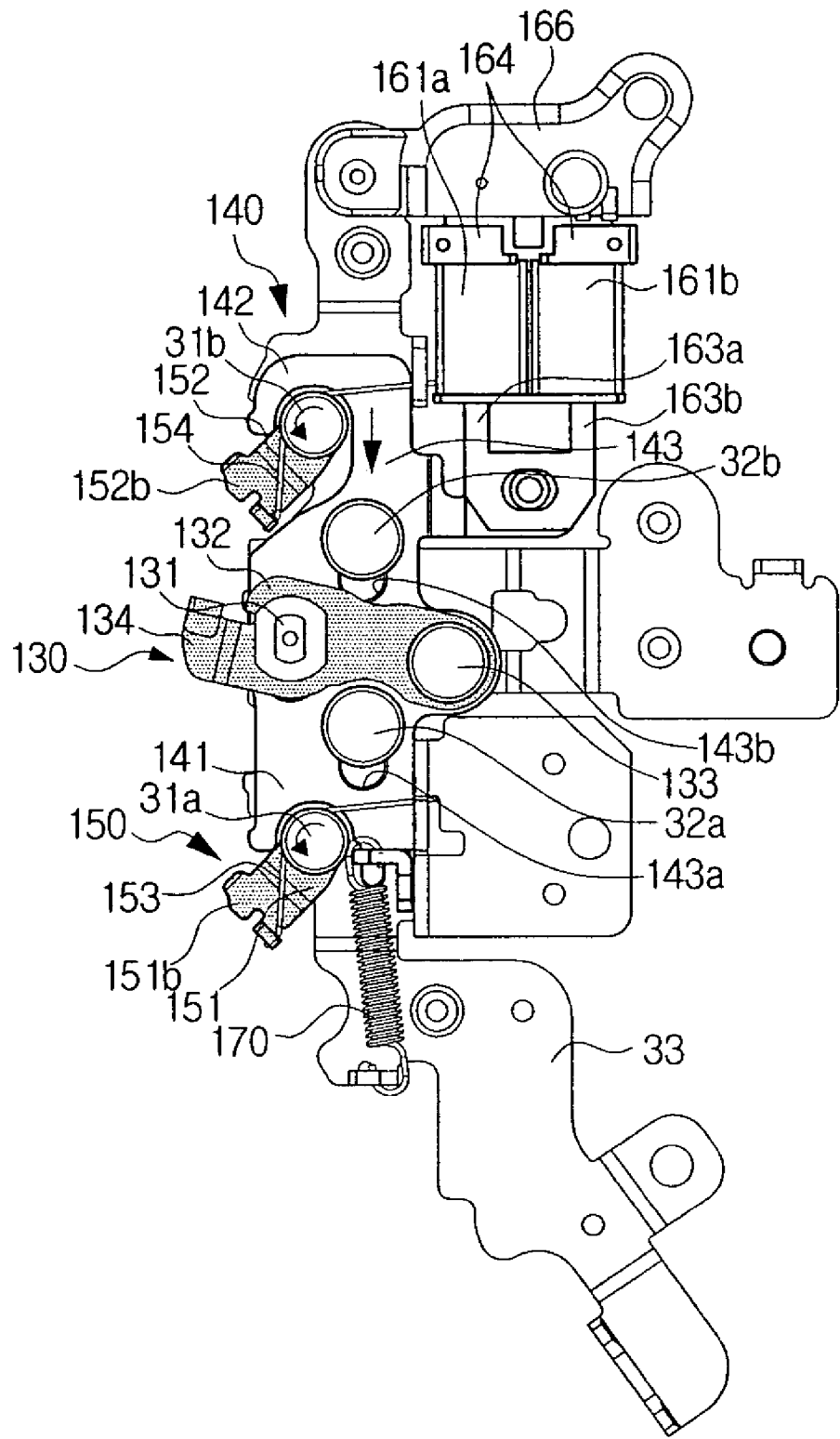
Figure 6C:
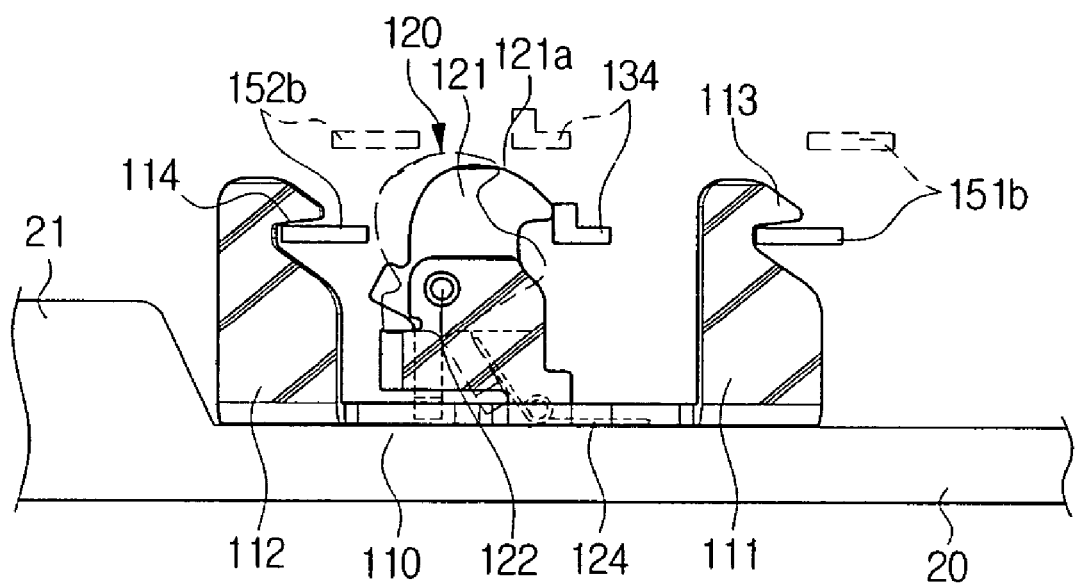

FIGS. 6A through 6C are views for explaining the operation of the housing ejecting unit 100 according to an exemplary embodiment of the present invention. FIG. 6A illustrates the operation of the housing ejecting unit 100 when the housing is closed. FIG. 6B illustrates the operation of the housing ejecting unit 100 when the housing is opened. FIG. 6C is a partial front view of the housing ejecting unit 100.

First, if a user tries to open the housing 20 when the housing 20 of the DVD camcorder is closed as shown in FIG. 6A and pushes a switch (not shown) of a DVD camcorder body 40, power is instantly applied to the solenoid unit 160 of the housing ejector unit 100. Then, power flows in the coils 161*a* and 161*b* of the solenoid unit 160, and a magnetic flux is generated around the bobbins 162*a* and 162*b* so that the plungers 163*a* and 163*b* are magnetically neutralized. In this situation, because the third elastic member 170 pulls the bracket 143 of the housing ejecting unit 100 from an opposite side to the solenoid unit 160 based on the first hinge axis 131, the plungers 163*a* and 163*b* are separated from the magnet 164. In other words, the solenoid unit 160 does not exert any force on the sliding member 140. Accordingly, the sliding member 140 is slid in the direction of the arrow in FIG. 6B by the third elastic member 170, and the first and second rotation guide portions 141 and 142 of opposite ends of the front side of the bracket 143 push the first and second lockers 151 and 152 in the arrowed direction. Therefore, the locking portions 151*b* and 152*b* of the first and second lockers 151 and 152 are rotated about the first and second rotation axes 31*a* and 31*b* in the directions the arrows of FIG. 6B and separated from the first and second locking protrusions 113 and 114 of the pair of connection members 110 so that the housing 20 can be opened. That is, the first and second lockers 151 and 152 are in a disengaged position.

Conversely, when a DVD D is loaded in the main frame 30 and the housing 20 is closed, a user softly pushes the housing 20 from the outside. Then, the ejector 121 comes into contact with the contact portion 134 of the link member 130 as shown in FIG. 6C. Thereafter, the ejector 121 is moved to the position shown in dotted lines, and simultaneously, the contact portion 134 is pushed to the right side of FIG. 6C, that is, the position shown in solid lines, along the inclined guide surface 121*a* of the ejector 121 based on the second hinge axis 122. Then, the sliding member 140 connected through the link axis 133 with the link member 130, is slid in the direction of the arrow shown in FIG. 6A. According to the sliding of the sliding member 140, the first and second rotation guide portions 141 and 142 of the bracket 143 are also slid in the direction of the arrow, and the first and second lockers 151 and 152 of the pair of locking members 150 are rotated about the first and second rotation axes 31*a* and 31*b* in the direction of the arrows in FIG. 6A. Accordingly, the locker portions 151*b* and 152*b* of the first and second lockers 151 and 152 are inserted into the first and second locking protrusions 113 and 114 of the first and second connection members 111 and 112 as shown in FIG. 6C so that the housing 20 is closed. That is, the first and second lockers 151 and 152 are in an engaged position. At this time, the plungers 163*a* and 163*b* of the solenoid unit 160 are inserted into the bobbins 162*a* and 162*b* according to the sliding of the bracket 143, and the plungers 163*a* and 163*b* are adhered to the magnet 164 by a magnetic force. Additionally, the ejector 121 of the ejecting member 120 returns to the original position by a fourth elastic member 124 and comes into contact with the contact portion 134.

When using the housing opening and closing apparatus according to an exemplary embodiment of the present invention, the housing 20 is easily opened by the operation of the solenoid unit 160 and is also easily closed by the simple operation of the inclined guide surface 121a of the ejector 121.

As described above, the housing opening and closing apparatus of the exemplary embodiment of the present invention allows the housing of the camcorder to be easily and conveniently opened and closed. Furthermore, the size of the housing opening and closing apparatus is reduced significantly, at least more than a half, in comparison with a conventional camcorder to conform to the trend of making DVD camcorders smaller.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A housing opening and closing apparatus for a DVD camcorder comprising:
    a main frame for accommodating a DVD;
    a housing, which is openable and closable with respect to the main frame; and
    a housing ejecting unit operated by a solenoid unit to open and close the housing;
    wherein the housing ejecting unit comprises:
    a pair of connection members disposed on the housing;
    an ejecting member between the pair of connection members on the housing;
    a link member rotatable about a first hinge axis, the link member being adapted to contact the ejecting member;
    a sliding member engaged with the first hinge axis and one end of the link member, the sliding member comprising a first end and a second end, the sliding member being adapted to slide;
    a pair of locking members rotated by sliding of the sliding member;
    a solenoid unit engaged with the first end of the sliding member; and
    a third elastic member disposed at the second end of the sliding member to oppose the solenoid unit.

2. The apparatus according to claim 1, wherein the pair of connection members comprise:
    a first connection member comprising a first locking protrusion; and
    a second connection member disposed opposite to the first connection member, the second connection member comprising a second locking protrusion.

3. The apparatus according to claim 2, wherein the first and second connection members are integrally formed.

4. The apparatus according to claim 1, wherein the ejecting member comprises:
    a second hinge axis engaged with a sidewall of the housing;
    an ejector rotatable about the second hinge axis, the ejector comprising an inclined guide surface; and
    a fourth elastic member disposed on the ejector.

5. The apparatus according to claim 1, wherein the first hinge axis engages the main frame.

6. The apparatus according to claim 1, wherein the link member comprises:
    a link body which is rotatably engaged with the first hinge axis, the link body comprising a first end and a second end, the first end of the link body contacting the ejecting member; and
    a link axis for movably engaging the second end of the link body with the sliding member.

7. The apparatus according to claim 1, wherein the sliding member comprises:
    a bracket comprising a third guide slit for receiving the first hinge axis; and
    a first rotation guide portion and a second rotation guide portion extending from the bracket to contact the pair of locking members.

8. The apparatus according to claim 7, wherein the bracket further comprises a first guide slit and a second guide slit to receive a first supporting axis and a second supporting axis disposed on the main frame.

9. The apparatus according to claim 1, wherein the pair of locking members comprise:
    a first rotation axis and a second rotation axis disposed at an interval on the main frame;
    a first locker rotatably engaged with the first rotation axis;
    a second locker rotatably engaged with the second rotation axis;
    a first elastic member disposed on the first rotation axis, a first end of the first elastic member engaging the first locker and a second end of the first elastic member engaging the main frame; and
    a second elastic member disposed on the first rotation axis, a first end of the second elastic member engaging the first locker and a second end of the second elastic member engaging the main frame.

10. The apparatus according to claim 9, wherein the first and second lockers are rotatable about the first and second rotation axes to be attached to and detached from the pair of connection members by sliding of the sliding member.

11. The apparatus according to claim 1, wherein the solenoid unit comprises:
    a pair of coils wound on a pair of bobbins;
    a pair of plungers reciprocally moved in the pair of bobbins, ends of the pair of plungers being engaged with the sliding member; and
    a magnet disposed on the pair of coils.

12. The apparatus according to claim 1, wherein the third elastic member comprises a tension spring, a first end of the third elastic member engaging the sliding member and a second end of the third elastic member engaging the main frame.

13. A camcorder comprising:
    a main body;
    a main frame disposed on the main body for accommodating a DVD;
    a housing, which is openable and closable with respect to the main frame; and
    a housing ejecting unit operated by a solenoid unit for opening and closing the housing;
    wherein the housing ejecting unit comprises:
    at least one connection member disposed on the housing;
    at least one locking member pivotably disposed on the main frame, the at least one locking member moving between an engaged position where the at least one locking member is engaged with the at least one connection member and a disengaged position where the at least one locking member is not engaged with the at least one connection member;
    an ejecting member disposed on the housing;
    a sliding member adapted to slide with respect to the main frame, the sliding member engaging the at least one locking member to move the locking member between the engaged and disengaged positions;

a link member rotatably disposed about a first hinge axis on the sliding member, the link member engaging the ejecting member to move the sliding member; and a solenoid unit engaged with the sliding member for controlling the sliding of the sliding member.

14. The apparatus according to claim 13, wherein the ejecting member comprises:

a second hinge axis engaged with a sidewall of the housing;

an ejector rotatable about the second hinge axis, the ejector comprising an inclined guide surface; and a fourth elastic member disposed on the ejector.

15. The camcorder according to claim 13, wherein the link member comprises:

a link body rotatably engaged with the first hinge axis, the link body comprising a first end and a second end, the first end of the link body engaging the ejecting member; and a link axis for engaging the second end of the link body with the sliding member.

16. The apparatus according to claim 13, wherein the sliding member comprises a bracket comprising a first guide slit and a second guide slit for receive first and second supporting axes disposed on the main frame.

17. The apparatus according to claim 16, wherein the bracket further comprises a third guide slit for receiving the first hinge axis.

18. The apparatus according to claim 13, wherein the at least one locking member comprises a locker rotatably disposed on the main frame and an elastic member for biasing the first locker toward an engaged position.

19. The apparatus according to claim 13, further comprising an elastic member for opposing the solenoid.

* * * * *

UNITED STATES PATENT AND TRADEMARK OFFICE
CERTIFICATE OF CORRECTION

| | | |
|---|---|---|
| PATENT NO. | : 7,612,962 B2 | Page 1 of 1 |
| APPLICATION NO. | : 11/481827 | |
| DATED | : November 3, 2009 | |
| INVENTOR(S) | : Min et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 515 days.

Signed and Sealed this

Nineteenth Day of October, 2010

David J. Kappos
*Director of the United States Patent and Trademark Office*